C. FOLSOM.
NOTES, CHECKS, &c., TO PREVENT ALTERATION.
No. 110,129. Patented Dec. 13, 1870.
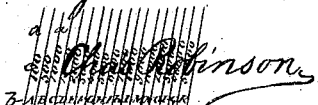
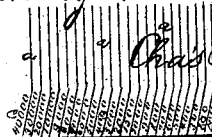
Witnesses: L. Hailer, Thomas Taylor
Inventor: C. Folsom by Dodge & Munn his attys.

United States Patent Office.

CHARLES FOLSOM, OF NEW YORK, N. Y.

Letters Patent No. 110,129, dated December 13, 1870.

IMPROVEMENT IN NOTES, CHECKS, &c., TO PREVENT ALTERATION.

The Schedule referred to in these Letters Patent and making part of the same.

*To all whom it may concern:*

Be it known that I, CHARLES FOLSOM, of New York, in the county of New York and State of New York, have invented certain Improvements in the Construction of Notes, Checks, Drafts, &c., to prevent alteration, of which the following is a specification, reference being had to the accompanying drawing.

My invention relates to methods for preventing the alteration or changing checks, notes, or other instruments, written or printed, given for the payment or receipt of money, and consists in so combining the signature with a table of figures, letters, or other similar and suitable characters, or with an arrangement of lines, the said tables or lines being made to represent any desired amounts, either whole or fractional.

In the drawing—

Figure 1 represents a plan view, showing a combination of the signature with a series of numbers, increasing from left to right.

Figure 2 represents the same, with a series of numbers, increasing from right to left.

Figure 3 represents the same, with the numbers arranged in two different ways.

Figs. 1 and 3 represent an arrangement of letters, and all of the figures represent lines, in and with which the signature may be combined.

The object of my invention is to produce such a blank-note, check, draft, bond, or other paper writing, either for the payment or receipt of money, with figures, letters, lines, or other characters, so written, printed, lithographed, or otherwise impressed upon its face, that the signature can be so combined with them as to indicate exactly, or within certain limits, the amount for which the same is given.

To accomplish this I arrange lines *a*, letters *b*, and figures *c*, as shown in fig. 1, with the figures increasing from left to right. They may be all combined as shown, or only lines, or letters, or figures be used; or, the lines *a* and figures *c* may be arranged as shown in fig. 2, with the figures increasing from right to left; or the lines *a*, letters *b*, and figures *c* may be arranged as shown in fig. 3, at *x;* or the figures may be arranged as shown at *y* in the same figure.

With blanks thus prepared, the signature can be readily combined with figures so as to represent either exactly or within certain limits the amount for which it is given; for instance, as shown in all the figures, suppose the paper given is for fifteen hundred dollars, or for an amount between fifteen hundred and sixteen hundred dollars, then the signature will begin at the figures 1500 and cancel all the rest of the figures on the right.

If letters, lines, or other characters are used, then these may stand either privately or as well-known symbols for certain amounts, and the signature may, in like manner, be combined with them.

In this way it will be seen that the signature combined with tables of figures, letters, &c., arranged as shown and described, will cancel all amounts exceeding that signed for when the numbers increase from left to right, or when the numbers increase from right to left all amounts below that signed for, so that should any alteration be attempted the limit of alteration in the one case will have to be between the lowest amount canceled in the table and the one next higher, and in the other, between the highest amount canceled and the one next lower.

Having thus described my invention,

What I claim is—

1. The combination of a table of figures, letters, lines, or other characters, representing amounts, written, printed, lithographed, or otherwise placed on any document, with the signature thereto, substantially as herein described and for the purpose set forth.

2. As an improvement in bank-notes, checks, or other similar papers representing value, placing upon that portion of the same designed for the signature a table of figures, lines, letters, or characters representing amounts, so arranged that the signature may be written thereon so as to indicate substantially the value of the same, as herein described.

CHARLES FOLSOM.

Witnesses:
H. B. MUNN,
W. C. DODGE.